(12) United States Patent
Holm

(10) Patent No.: US 9,934,037 B2
(45) Date of Patent: Apr. 3, 2018

(54) DECODING A COMPLEX PROGRAM INSTRUCTION CORRESPONDING TO MULTIPLE MICRO-OPERATIONS

(71) Applicant: ARM Limited, Cambridge (GB)

(72) Inventor: Rune Holm, Cambridge (GB)

(73) Assignee: ARM Limited, Cambridge (GB)

( * ) Notice: Subject to any disclaimer, the term of this patent is extended or adjusted under 35 U.S.C. 154(b) by 839 days.

(21) Appl. No.: 14/466,183

(22) Filed: Aug. 22, 2014

(65) Prior Publication Data

US 2015/0100763 A1    Apr. 9, 2015

(30) Foreign Application Priority Data

Oct. 9, 2013  (GB) .................................. 1317857.9

(51) Int. Cl.
| | |
|---|---|
| *G06F 9/22* | (2006.01) |
| *G06F 9/45* | (2006.01) |
| *G06F 9/30* | (2018.01) |
| *G06F 9/38* | (2018.01) |
| *G06F 9/32* | (2018.01) |

(52) U.S. Cl.
CPC ........ *G06F 9/30145* (2013.01); *G06F 9/3017* (2013.01); *G06F 9/3851* (2013.01); (Continued)

(58) Field of Classification Search
CPC .. G06F 9/30145; G06F 9/3017; G06F 9/3851; G06F 9/3887; G06F 9/321;
(Continued)

(56) References Cited

U.S. PATENT DOCUMENTS

| | | | | |
|---|---|---|---|---|
| 5,574,883 A | * | 11/1996 | Freeman ................... | G06F 9/26 711/118 |
| 7,353,364 B1 | * | 4/2008 | Chong ................... | G06F 9/3802 712/215 |

(Continued)

FOREIGN PATENT DOCUMENTS

| | | |
|---|---|---|
| CN | 1426553 | 6/2003 |
| JP | 2011-113457 | 6/2011 |

(Continued)

OTHER PUBLICATIONS

UK Search Report for GB Application No. 1317857.9, dated Feb. 18, 2014, 3 pages.
(Continued)

*Primary Examiner* — Daniel H Pan
(74) *Attorney, Agent, or Firm* — Nixon & Vanderhye P.C.

(57) ABSTRACT

A data processing apparatus 2 has processing circuitry 4 which can process multiple parallel threads of processing. A shared instruction decoder 30 decodes program instructions to generate micro-operations to be processed by the processing circuitry 4. The instructions include at least one complex instruction which has multiple micro-operations. Multiple fetch units 8 are provided for fetching the micro-operations generated by the decoder 30 for processing by the processing circuitry 4. Each fetch unit 8 is associated with at least one of the threads. The decoder 30 generates the micro-operations of a complex instruction individually in response to separate decode requests 24 triggered by a fetch unit 8, each decode request 24 identifying which micro-operation of the complex instruction is to be generated by the decoder 30 in response to the decode request 24.

18 Claims, 6 Drawing Sheets

(52) U.S. Cl.
CPC .............. *G06F 9/3887* (2013.01); *G06F 8/41* (2013.01); *G06F 8/52* (2013.01); *G06F 9/321* (2013.01); *G06F 9/3818* (2013.01)

(58) Field of Classification Search
CPC ........ G06F 9/3818; G06F 12/123; G06F 8/41; G06F 8/52
USPC ......... 712/205–213, 214, 215; 711/133, 136; 717/136
See application file for complete search history.

(56) References Cited

U.S. PATENT DOCUMENTS

| | | | |
|---|---|---|---|
| 7,587,583 B2* | 9/2009 | Chauvel | G06F 9/30174 712/226 |
| 7,856,633 B1* | 12/2010 | Lee | G06F 9/3017 711/129 |
| 2006/0026574 A1* | 2/2006 | Lesot | G06F 9/30174 717/140 |

FOREIGN PATENT DOCUMENTS

| | | |
|---|---|---|
| WO | WO 00/67113 | 11/2000 |
| WO | WO 01/53935 | 7/2001 |

OTHER PUBLICATIONS

Chinese First Office Action dated Nov. 28, 2017 in CN 201410521111.7 and English translation, 14 pages.

\* cited by examiner

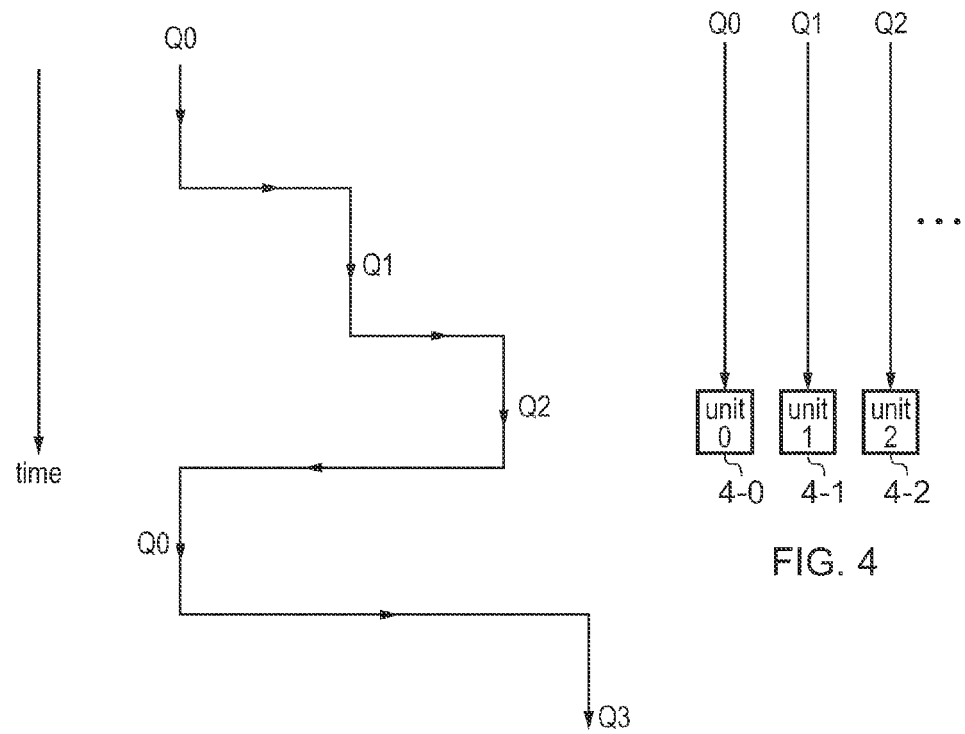

| cycle | fetch 0 | fetch 1 | decoder 30 |
|---|---|---|---|
| 0 | fetch (LDM) | | |
| 1 | | | LDM(μop 0) |
| 2 | | | LDM(μop 1) |
| 3 | | | LDM(μop 2) |
| 4 | stall ! | fetch (ADD) | LDM(μop 3) |
| 5 | | | stall |
| 6 | | | |
| 7 | unstall ! | | |
| 8 | | | LDM(μop 4) |
| 9 | | | LDM(μop 5) |
| 10 | | | ADD |

FIG. 5

| cycle | fetch 0 | fetch 1 | decoder 30 |
|---|---|---|---|
| 0 | fetch (LDM,μop 0) | | |
| 1 | fetch (LDM,μop 1) | | LDM(μop 0) |
| 2 | fetch (LDM,μop 2) | | LDM(μop 1) |
| 3 | fetch (LDM,μop 3) | | LDM(μop 2) |
| 4 | stall ! | fetch (ADD) | LDM(μop 3) |
| 5 | | | ADD |
| 6 | | | |
| 7 | unstall fetch (LDM,μop 4) | | |
| 8 | fetch (LDM,μop 5) | | LDM(μop 4) |
| 9 | | | LDM(μop 5) |

FIG. 6

Decode

L0 I$

DECODING A COMPLEX PROGRAM INSTRUCTION CORRESPONDING TO MULTIPLE MICRO-OPERATIONS

This application claims priority to GB Application No. 1317857.9, filed on Oct. 9, 2013; the entire content of which is hereby incorporated by reference.

The present technique relates to the field of data processing. More particularly, it relates to decoding program instructions to generate micro-operations in a data processing apparatus supporting parallel threads of processing.

Some instruction sets include some complex program instructions which correspond to multiple micro-operations to be performed by she processing circuitry, each micro-operation representing part of the operation associated with the program instruction. Hence, an instruction decoder may decode program instructions to generate micro-operations to be performed by the processing circuitry.

Some processing apparatuses support multiple parallel threads of processing. Separate fetch units may be provided for respective threads to trigger fetches of micro-operations into the processing circuitry. A shared instruction decoder may be provided to generate the micro-operations required by the respective fetch units. Typical instruction decoders decode complex program instructions as a single entity so that, in response to a request for decoding of the complex program instruction from one of the fetch units, the instruction decoder will then generate all the micro-operations corresponding to that complex program instruction in successive cycles. However, this can be problematic in a system where the shared instruction decoder is shared between multiple fetch units corresponding to threads of processing. If one of the fetch units is stalled partway through fetching the micro-operations corresponding to a complex program instruction, so cannot accept further micro-operations for the same complex program instruction, then the shared decoder will also stall because it is committed to finishing all the micro-operations for the complex program instruction. This prevents other fetch units from receiving decoded micro-operations from the instruction decoder until the stall of the first fetch unit is resolved, even though those other fetch units could have accepted micro-operations. This causes reduced processing performance. The present technique seeks to address this problem.

Viewed from one aspect, the present technique provides a data processing apparatus comprising:

processing circuitry configured to process a plurality of threads of processing in parallel;

a shared instruction decoder configured to decode program instructions to generate micro-operations to be processed by the processing circuitry, the program instructions comprising at least one complex program instruction corresponding to a plurality of micro-operations; and a plurality of fetch units configured to fetch, for processing by the processing circuitry, the micro-operations generated by the shared instruction decoder, each fetch unit associated with at least one of the plurality of threads;

wherein the shared instruction decoder is configured to generate each micro-operation in response to a decode request triggered by one of the plurality of fetch units; and the shared instruction decoder is configured to generate the plurality of micro-operations of a complex program instruction individually in response to separate decode requests each identifying which micro-operation of the complex program instruction is to be generated by the shared instruction decoder in response to the decode request.

Viewed from another aspect, the present technique provides a data processing apparatus comprising:

processing means for processing a plurality of threads of processing in parallel:

shared instruction decoding means for decoding program instructions to generate micro-operations to be processed by the processing means, the program instructions comprising at least one complex program instruction corresponding to a plurality of micro-operations; and a plurality of fetch means for fetching, for processing by the processing means, the micro-operations generated by the shared instruction means, each fetch means associated with at least one of the plurality of threads;

wherein the shared instruction decoding means is configured to generate each micro-operation in response to a decode request triggered by one of the plurality of fetch means; and the shared instruction decoding means is configured to generate the plurality of micro-operations of a complex program instruction individually in response to separate decode requests each identifying which micro-operation of the complex program instruction is to be generated by the shared instruction decoding means in response to the decode request.

Viewed from a further aspect, the present technique provides a data processing method, comprising:

decoding program instructions with a shared instruction decoder to generate micro-operations to be processed, the program instructions comprising at least one program instruction corresponding to a plurality of micro-operations; and fetching for processing the micro-operations generated by the shared instruction decoder, wherein the fetching is performed with a plurality of fetch units, each fetch unit associated with at least one of a plurality of threads processed in parallel;

wherein each micro-operation is generated by the shared instruction decoder in response to a decode request triggered by one of the plurality of fetch units; and the shared instruction decoder generates the plurality of micro-operations of a complex program instruction individually in response to separate decode requests each identifying which micro-operation of the complex program instruction is to be generated in response to the decode request.

Further aspects, features and advantages of the present technique will be apparent from tire following description, which is to be read in conjunction with the accompanying drawings in which:

FIG. 1 schematically illustrates a portion of a data processing apparatus;

FIG. 2 schematically illustrates parallel processing of multiple instances of the same set of micro-operations;

FIG. 3 illustrates time division multiplexing of different threads of processing;

FIG. 4 illustrates parallel processing of threads using respective processing units;

FIG. 5 illustrates a problem encountered in previous systems where a stall in one fetch unit causes a stall in the instruction decoder even if another fetch unit could accept a decoded micro-operation;

FIG. 6 illustrates how this problem can be solved by generating the micro-operations of a complex instruction individually in response to the separate decode requests;

Figure 1:
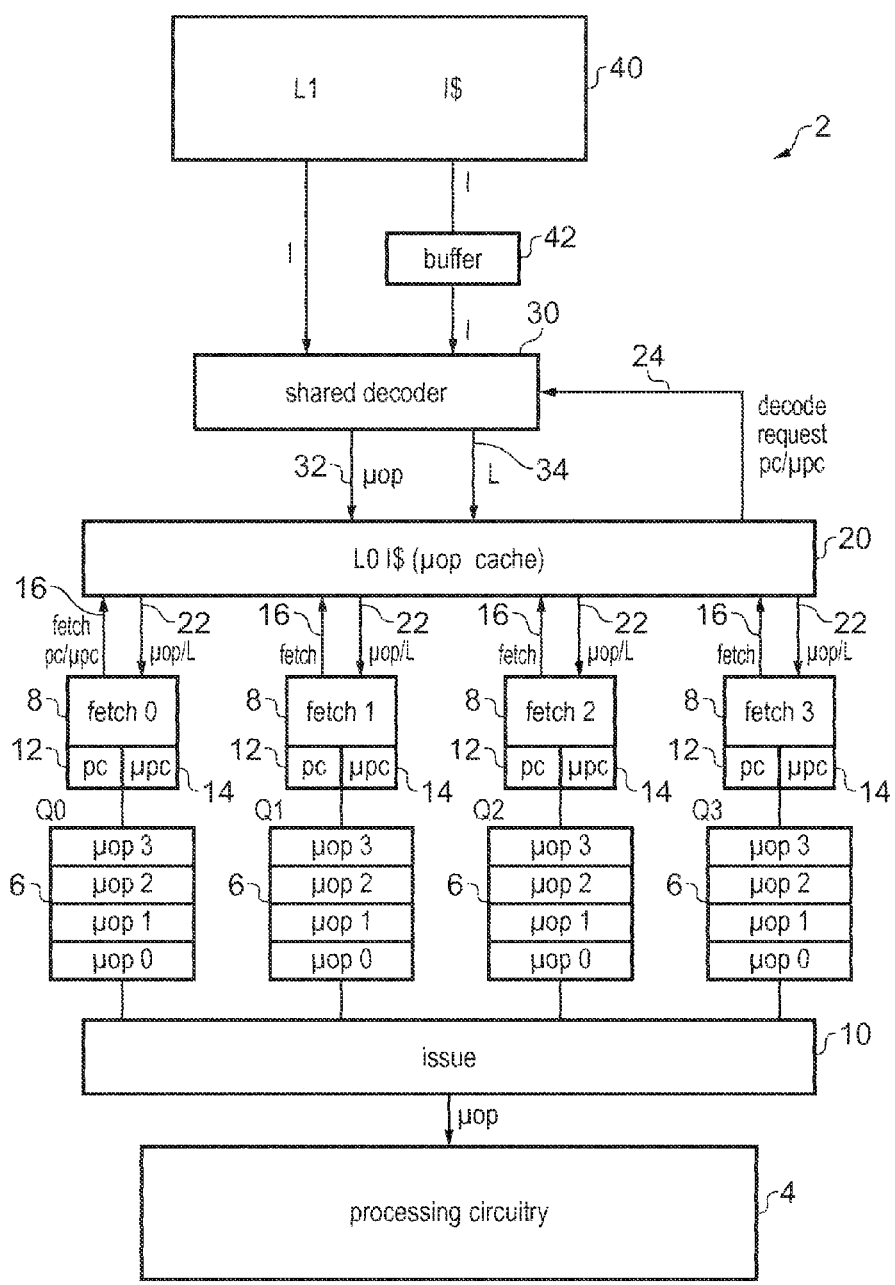

An instruction decoder generates the micro-operations of a complex program instruction individually in response to separate decode requests triggered by the fetch units. Bach decode request may identify a particular micro-operation of the complex program instruction which is to be generated in response to the decode request. Hence, rather than generating all the micro-operations in response to a single request as in previous systems, after each successive decode request the instruction decoder may decode the requested micro-operation of the complex program instruction and then wait for a further decode request before decoding another micro-operation. By requiring each micro-operation to be requested individually, this allows the shared instruction decoder to switch which instruction is being decoded partway through generating the micro-operations for a complex program instruction. Therefore, even if one fetch unit stalls after only some of the micro-operations required for a complex program instruction have been generated, the decoder can switch to generating micro-operations requested by another fetch unit and then return to generating the remaining micro-operations of the first program instruction when the fetch unit requesting these micro-operations has unstalled. This reduces the number of cycles in which the instruction decoder is inactive and hence improves processing performance of the data processing apparatus as a whole.

In some examples, each thread to be processed by the processing circuitry may have its own fetch unit for fetching the micro-operations to be performed for that thread, in other examples, at least one of the fetch units may be shared between multiple threads.

In some examples, each fetch unit may send the fetched micro-operations directly to the processing circuitry for processing. On the other hand, micro-operation queues may be provided, each queue corresponding to one of the fetch units so that the micro-operations fetched by the fetch unit are queued in the corresponding queue. The queued micro-operations may then be issued for processing by the processing circuitry, if micro-operation queues are provided, then the fetch unit may for example request the next micro-operation when space becomes available in the queue.

The fetch unit may trigger the decode request in different ways. In some examples, the micro-operations generated by the instruction decoder may be passed directly to the corresponding fetch unit. In this case, the fetch unit may generate the decode request identifying a selected micro-operation which is to be decoded and fetched for processing by the processing circuitry. In response to the decode request from the fetch unit, the instruction decoder may generate the selected micro-operation and send it to the fetch unit.

In other examples, the fetch unit may indirectly trigger the decode request and need not generate the decode request itself. For example, a micro-operation cache may be provided to store the micro-operations generated by the shared instruction decoder. Often, the same micro-operation may be required multiple times within the same thread or within different threads, and so by caching the micro-operations generated by the decoder, energy efficiency can be improved since this avoids the need for the decoder to repeatedly generate the same micro-operation. If the micro-operation cache is provided, then the fetch circuitry may provide a fetch request to the micro-operation cache to request fetching of a selected micro-operation from the cache, and then the micro-operation cache may trigger the decode request to the instruction decoder if the selected micro-operation is not in the cache. If the selected micro-operation is already in the cache then a decode request may be unnecessary. Tire decode request triggered by the micro-operation cache may pass directly to the instruction decoder, or indirectly via another circuit element such as a higher level cache storing the program instructions to be decoded.

The micro-operation cache may support a greater number of requests per processing cycle than a number of decode requests per processing cycle supported by the shared instruction decoder. This means that the cache can provide an apparent instruction fetch bandwidth to the fetch unit which is greater than the shared instruction decoder can sustain. This is particularly useful when there are multiple fetch units corresponding to a single shared instruction decoder, in embodiments where the shared instruction decoder can support two or more decode requests per processing cycle, so that multiple micro-operations can be generated in the same cycle, the two or more decode requests may be for micro-operations corresponding to different program instructions altogether, or for different micro-operations of the same program instruction. Nevertheless, even where multiple micro-operations are generated in the same cycle, each micro-operation may still be generated in response to a separate decode request.

As well as generating the micro-operation itself the shared instruction decoder may also generate a corresponding control flag indicating whether the generated micro-operation is the last micro-operation for the corresponding instruction. The fetch unit may maintain a program counter and a micro program counter for identifying the next micro-operation to be fetched. The program counter indicates the program instruction corresponding to the next micro-operation to be fetched and the micro program counter indicates which micro-operation of that instruction is the next micro-operation to be fetched. The control flag allows the fetch unit to determine whether to increment the micro program courtier or the program counter when it receives the fetched micro-operation. If the control flag for a fetched micro-operation indicates that the fetched micro-operation is not the last micro-operation, then the micro program counter may be incremented to indicate that the following micro-operation for the same instruction should be fetched next. On the other hand, if the control flag indicates that the fetched micro-operation is the last micro-operation, then the program counter may be incremented to indicate the next program instruction. When incrementing the program counter, the micro program counter may also be reset to indicate the first micro-operation to be fetched for the next program instruction. By generating the control flag using the instruction decoder when a micro-operation is decoded, the fetch unit does not need to keep track of how many micro-operations correspond to each program instruction or whether there are any further micro-operations to be received for the same instruction. This simplifies the configuration of the fetch unit.

The apparatus may have an instruction buffer which, stores one or mote program instructions previously decoded by the shared instruction decoder. Since each micro-operation of a complex program instruction is decoded individually in response to separate requests, the same program instruction may be required for several successive processing cycles to allow the decoder to generate ail the micro-operations for that instruction. By storing one or more recently decoded program instructions in the instruction buffer, performance and energy efficiency can be improved because thus reduces the likelihood that the same instruction needs to be fetched multiple times from a higher level instruction data store, such as an instruction cache or memory. When a decode request is received for a given program instruction, the decoder may check whether the instruction is in the instruction buffer, and if so fetch it from the instruction buffer. If the specified program instruction is not in the instruction buffer, then the decoder may obtain the specified program instruction from an instruction cache or memory. Typically, the buffer may store the one or more most recently decoded program instructions, although it could instead have a more complicated eviction scheme for determining which program instructions should be buffered and which should be evicted from the buffer. Also, while it is possible for the buffer to store more than one instruction, in many cases a significant performance improvement may be achieved with a buffer with capacity for only a single program instruction, and this will be more efficient to implement in hardware than a larger buffer. In embodiments where the buffer only stores one instruction and the most recently decoded instruction is placed in the buffer and then overwritten with the next instruction when the next instruction is decoded, the instruction decoder can determine whether a required instruction is in the buffer by checking whether the program counter for the current decode request is the same as the program counter for the preceding decode request. On the other hand, if the decoder supports multiple decode requests per cycle then it may be useful to provide a buffer capable of holding multiple instructions, in which case it may be required to match the program counter against address tags stored with each instruction in the buffer.

The processing circuitry may process the threads in parallel in different ways. In some cases, the processing circuitry may have multiple processing units which can each process at least one of the threads. On the other hand, other embodiments may perform time division multiplexing of threads using a common set of hardware, for example with each thread having an allocated time slot when the processing circuitry executes that thread. Hence it is not essential for the processing circuitry to actually perform several operations in parallel at any one time it is sufficient that the threads are active simultaneously but processed one at a time by time division multiplexing.

In some cases, for at least one of the threads the processing circuitry may execute in parallel multiple instances of the same block of micro-operations in lockstep with different operands for each instance. This approach is sometimes referred to as simultaneous multithreading (SIMT). This is particularly useful for processing where the same set of micro-operations need to be performed on many sets of data values, which is particularly common in graphics processing for example. To support this, the processing circuitry may have a set of parallel arithmetic units for performing each instance of the micro-operations, with the arithmetic units being controlled by a common control unit using a shared program counter and micro program counter. In some cases, there may be multiple parallel SIMT groups, each SIMT group processing a plurality of instances of the micro-operations for a given thread in parallel with different operand values.

The present technique is particularly useful for systems in which the processing circuitry comprises a graphics processing unit (GPU). Typically, GPUs may require a large number of threads of processing. While conventional GPUs would not use instruction sets having complex program instructions corresponding to multiple micro-operations, and so the problem addressed by the present technique does not often arise in such GPUs, the present technique recognises that it is desirable to provide a GPU which can be controlled using a general purpose instruction set architecture which includes complex program instructions. By using a general purpose instruction set to control a GPU having many threads, this allows for compatibility of the GPU with code written for other devices such as a central processing unit (CPU) or other general purpose processing units, making programming simpler. By addressing the performance bottleneck caused by decoding of complex instructions in a many-threaded system in which a shared instruction decoder is shared between multiple fetch units, the present technique facilitates the use of general purpose instruction set architectures in GPUs. This is in contrast to many CPUs which use their own special instruction set which typically would not have any complex program instructions.

As discussed above, the ability to individually generate each micro-operation of a complex program instruction in response to separate decode request is useful because it permits switching of decoding between instructions after generating only some of the micro-operations of the first instruction. In response to a first decode request, the decoder may decode a first program instruction to generate a first micro-operation of the first program instruction. In response to a second decode request identifying a micro-operation of a second program instruction, the second program instruction can be decoded to generate the identified micro-operation. The decoder can later return to decoding the first program instruction in response to a third decode request requesting generation of a second micro-operation of the first program instruction. Hence, the decoder can interrupt decoding of one instruction and generate a micro-operation of another instruction before returning to the original instruction, which is not possible with typical decoding mechanisms.

FIG. 1 schematically illustrates a portion of a data processing apparatus 2 for processing data. The apparatus 2 has processing circuitry 4 which can perform multiple parallel threads of processing. The apparatus 2 executes an instruction set which includes complex program instructions corresponding to multiple micro-operations to be performed by the processing circuitry 4. An example of a complex program instruction is a load or store multiple instruction for loading multiple values from memory into registers of the processing circuitry 4 or storing multiple values from registers of the processing circuitry 4 to memory. The load/store multiple instruction may be decoded to generate multiple micro-operations each for loading/storing one of the multiple values. Another example of a complex program instruction is an instruction for performing a relatively complex arithmetic operation such as a square root operation or floating point arithmetic operation. The complex arithmetic instruction may be mapped to several simpler micro-operations to be performed by the processing circuitry 4. Hence, while the processing circuitry 4 executes micro-operations (μops) the apparatus receives complex instructions 1 which need to be decoded into micro-operations. The instruction front end for fetching program instructions, decoding them into micro-operations, and fetching the micro-operations for processing is shown in FIG. 1. It will be appreciated that the data processing apparatus 2 may have many other elements that are not shown in FIG. 1 for conciseness.

The apparatus 2 has several instruction queues 6, each queue 6 corresponding to at least one thread of processing to be performed by the processing circuitry 4. Each queue has a limited amount of space for storing micro-operations to be performed by the processing circuitry 4. In the example of FIG. 1, each queue 6 has a depth of four micro-operations, although in other examples the queues 6 may store a greater or smaller number of micro-operations, and it is possible for different queues 6 to store different numbers of micro-operations. Each queue has a corresponding fetch unit 8 for fetching micro-operations into the corresponding queue 6. Micro-operations from the queue are issued for processing by issue circuitry 10.

As shown in FIGS. 2 to 4, the processing circuitry 4 may handle the parallel processing of the respective threads represented by queues 6 in different ways. FIG. 3 shows an example of time division multiplexing the respective threads so that a single processing unit can be shared between the threads. Each thread Q0, Q1, Q2, Q3 is allocated a time slot for processing by the processing circuitry 4. In some examples, the processing circuitry 4 may cycle through executing each thread Q0, Q1, Q2, Q3 in order, while in other examples there may be a priority mechanism or similar scheme for selecting which threads are executed when. Alternatively, as shown in FIG. 4 the processing circuitry 4 may have multiple processing units 4-0, 4-1, 4-2 which can each process a respective thread simultaneously, so that multiple threads are executed at the same time.

As shown in FIG. 2, with either of the approaches of FIGS. 3 and 4 it is possible for the same group of micro-operations for a particular thread (e.g. thread Q0) to be processed multiple times in parallel with different operands being used for each instance of the group of micro-operations. This approach is sometimes referred to as SIMT. A single program counter and micro program counter is maintained for each of the instances 0, 1, 2, . . . , N so that the instances proceed in lockstep with the same instructions executed for each instance. However, different operand values may be used for each instance. As shown in FIG. 2, for example the values added in response to the ADD micro-operation µop0 are different for each instance and produce different results. It is not essential for every micro-operation in the common block of micro-operations to be performed by every instance. For example, as shown in FIG. 2 in response to a branch instruction BR some instructions may branch to omit certain instructions such as the multiply micro-operation µop2 in FIG. 2. Nevertheless, as processing proceeds in lockstep then the instances which do not require the multiply micro-operation must wait until the program counter or micro program counter has reached micro-operation µop3 before proceeding with that micro-operation. This approach is useful when the same set of operations need to be performed on a large set of data values, which is often useful in graphics processing in particular. For example, the common set of micro-operations may implement a fragment shader which determines what colour should be rendered in a given pixel of an image. The satire fragment shader program may be executed in parallel for a block of adjacent pixels with different operands for each pixel. This approach is most efficient when the parallel instances do not diverge significantly from each other in terms of the path they take through the program or the memory accesses made. Any of the threads corresponding to the queues Q0, Q1, Q2 etc. may use such SIMT processing, in some embodiments, all of the queues of micro-operations may be carried out as a SIMT group on multiple sets of data values.

As shown in FIG. 1, each fetch unit 8 may maintain a program counter 12 (PC) and a micro program counter 14 (µPC) which together indicate the next micro-operation to be fetched into the corresponding queue 6. The program counter 12 is an indication of which program instruction 1 corresponds to the next micro-operation to be fetched and the micro program counter 14 indicates which micro-operation within that program instruction should be fetched next. When space becomes available in the corresponding queue 6, then the fetch unit 8 issues a fetch request 16 to a level 0 (L0) instruction cache 20 for caching micro-operations. The fetch request 16 specifies the current value of the program counter 12 and micro program counter 14. In response to the fetch request 16, the L0 instruction cache 20 (also referred to as a micro-operation cache) checks whether it currently stores the micro-operation indicated by the program counter and micro program counter in the fetch request 16, and if so, then the L0 instruction cache 20 sends the requested micro-operation 22 to the fetch unit 8 which issued the fetch request 16.

On the other hand, if the requested micro-operation is not in the L0 instruction cache 20 then a decode request 24 is issued to a shared instruction decoder 30 which is shared between the respective fetch units 8. In some embodiments, the shared instruction decoder 30 could be a pre-decoder in a two-level decoding scheme, with the rest of the decoding happening later in the pipeline. The processing circuitry 4 may have a separate decoder for decoding micro-operations. The decode request 24 specifies the program counter and micro program counter values indicated in the fetch request 16 which triggered the decode request, so that the decoder 30 can identify the micro-operation to be generated. In response to the decode request 24 the decoder 30 decodes the program instruction 1 indicated by the program counter of the decode request 24 to generate the micro-operation indicated by the micro program counter of the decode request 24. Unlike previous instruction decoders 30, for a complex program instruction 1 corresponding to multiple micro-operations, the decoder 30 generates a single micro-operation in response to the decode request 24, with other micro-operations for the same instruction 1 being generated in response to separate decode requests 24 for those micro-operations. Hence, each micro-operation of a complex program instruction is generated individually in response to a separate decode request 24.

The decoder 30 outputs the generated micro-operation 32 and a corresponding control flag 34 to the L0 instruction cache 20, which caches the micro-operation and control flag. The control flag 34 indicates whether the generated micro-operation 32 was the last micro-operation for the corresponding program instruction 1 or whether there are further micro-operations to be generated for that instruction 1. The control flag L is provided to the fetch unit 8 along with a fetched micro-operation. As discussed with respect to FIG. 9 below, the control flag L controls whether the fetch unit 8 increments the program counter 12 or the micro program counter 14 to indicate the next micro-operation to be fetched.

The shared instruction decoder 30 obtains instructions to be decoded from a level 1 (L1) instruction cache 40 which caches instructions fetched from memory. In other examples the L1 instruction cache 40 may not be provided and instead the shared decoder 30 may obtain the instructions directly from memory. However, providing the L1 instruction cache 40 is advantageous to reduce the latency and energy overhead associated with fetching instructions 1 into the decoder 30.

Since the decoder 30 decodes each micro-operation of a complex instruction individually in response to a separate decode request 24, it is possible that the same instruction may need to be decoded in several successive cycles. To improve performance, an instruction buffer 42 is provided between the L1 instruction cache 40 and the shared instruction decoder 30 to store at least one recently decoded instruction. In this embodiment, the buffer 42 stores the previously decoded instruction, so that if the same instruction is required in the next cycle then it can be fetched more efficiently from the buffer 42 instead of the L1 instruction cache 40. Hence, if the program counter of the decode request 24 is the same as the program counter for the previous decode request 24, then the decoder 30 can use the instruction in the buffer 42, and if the program counter is different to the previously requested program counter then the instruction can be fetched from the L1 instruction cache 40. In other embodiments, the buffer 42 may store multiple instructions and the decoder 30 can determine based on the address associated with each buffered instruction whether the instruction corresponding to the program counter of the decode request 24 is in the buffer 42.

The micro-operation queues 6 shown in FIG. 1 are optional, and in other examples the fetch unit 8 may output the fetched micro-operations directly to the issue circuitry 10. However, the queues 6 enable improved performance because while the micro-operations of one thread are being issued from one queue 6 to the processing circuitry 4, the micro-operations for another thread can be fetched into another queue 6, rather than having to wait for the issue stage 10 to be ready for issuing micro-operations before they can be fetched from the L0 cache 20. In some embodiments the fetch unit 8 and corresponding instruction queue 6 may be combined in a single unit.

The micro-operation cache 20 allows the same micro-operation to be decoded once and then fetched multiple times, improving performance and reducing energy consumption by avoiding repeated decoding of the same micro-operation. The micro-operation cache 20 also improves the apparent fetch bandwidth since it can support a greater number of fetch requests 16 per processing cycle than the decoder 30 can support decode requests 24 per processing cycle. Nevertheless, the micro-operation cache 20 may be optional and in other embodiments the shared decoder 30 may provide the micro-operations directly to the fetch units 8. In this case, the fetch unit 8 may send the fetch request 16 directly to the shared decoder 30, so that the fetch request 16 also functions as the decode request 24.

Similarly, the instruction buffer 42 is optional and in other examples the shared decoder 30 may obtain all the program instructions 1 from the L1 instruction cache 40 or a memory.

FIGS. 5 and 6 show an example of how decoding each micro-operation separately in response to individual decode requests can improve performance. FIG. 5 shows a comparative example showing stalling of the decoder 30 which can arise if a complex program instruction 1 is decoded in its entirety in response to a single decode request, as in previous decoding techniques. FIG. 5 shows an example in which in processing cycle 0 the fetch unit 0 issues a fetch request 16 to request fetching of a complex load multiple (LDM) program instruction which loads, for instance, six different values from memory into registers of the processing circuitry 4. Hence, the LDM instruction is decoded into six separate micro-operations μop0 to μop5. In response to the fetch request, the micro-operation cache 20 determines that the required operations are not in the cache 20 and so issues a corresponding decode request 24 to the decoder 30. In response to the decode request, the decoder 30 begins to decode the micro-operations for the LDM instruction at cycle 1, and then continues to generate the other micro-operations for the LDM instruction in the following cycles, 2, 3, 4. However, at cycle 4 the fetch unit 0 is stalled, for example because the corresponding queue Q0 cannot accept any further micro-operations. The decoder is committed to generating all the micro-operations for the load multiple instruction, and cannot interrupt decoding partially through an instruction, because if the decoder interrupted decoding of the load multiple instruction then it would not know where to stall again later. Therefore, the decoder must also stop decoding micro-operations, and so the stall propagates back from the fetch unit 0 to the decoder 30. Therefore, during processing cycles 5, 6, 7, no micro-operations are generated. The decoder 30 only starts decoding again once the fetch unit 0 has unstalled, and then completes the remaining micro-operations μop4, μop5. Once all the micro-operations for the LDM instruction have been generated, the decoder 30 can then switch to generating a micro-operation ADD for another fetch unit 1. However, the fetch/decode request for the ADD instruction was made in processing cycle 4, and fetch unit 1 was not stalled and so could have accepted the ADD micro-operation if it had been generated during one of the cycles 5, 6, 7 when the decoder 30 was stalled.

In contrast, FIG. 6 shows how the stalling of the decoder can be avoided by decoding each micro-operation of a complex instruction separately in response to separate decode requests. The fetch unit 8 provides separate fetch requests for each individual micro-operation. Hence, the fetch unit 0 which requires the LDM instruction to be performed issues fetch requests in cycles 0 to 3 corresponding to micro-operations μop0 to μop3. The L0 cache 20 does not contain these micro-operations and so triggers corresponding decode requests to the decoder 30. The decoder responds to each decode request by generating the corresponding micro-operation in cycles 1 to 4. When the fetch unit 0 stalls in cycle 4, then the decoder 30 does not stall because it is not committed to finishing all the micro-operations for the LDM instruction since it can generate the remaining micro-operations μop4, μop5 later in response to separate decode requests. Therefore, in cycle 5 the decoder 30 can instead generate the ADD micro-operation required by fetch unit 1. Similarly, decode requests for other instructions or from other fetch units could be handled by the decoder 30 during cycles 6 and 7. When the fetch unit 0 has unstalled at cycle 7, then it begins issuing fetch requests for the remaining micro-operations μop4, μop5 and this triggers new decode requests to the decoder 30 which then generates these micro-operations in cycles 8, 9. Therefore, the decoder 30 can now rapidly switch between decoding different instructions in the middle of an instruction, to allow performance to be improved.

Figure 7:
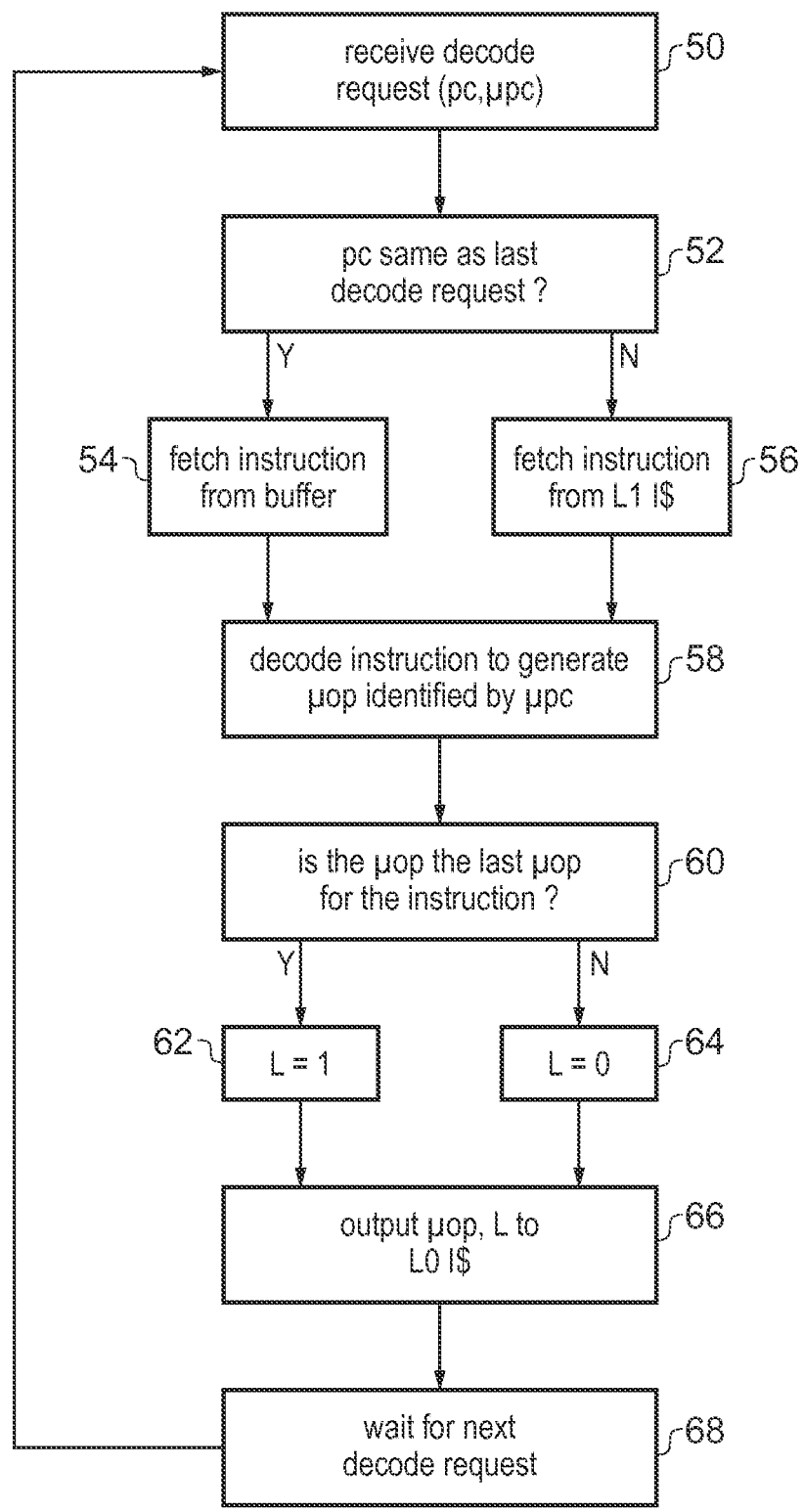
FIG. 7 illustrates a method of decoding instructions to generate micro-operations.

FIG. 7 is a flow diagram illustrating an example of the operation of the shared instruction decoder 30. At step 50, the decoder 30 receives a decode request 24 specifying a program counter and micro program counter which together identify the micro-operation to be generated. At step 52, the decoder 30 determines whether the program counter specified in the decode request 24 is the same as the program counter for the last decode request. If so then at step 54 the required instruction is fetched from the instruction buffer 42 which stores the most recently decoded instruction. If the program counter is not the same as the program counter of the last decode request, then at step 56 the decoder 30 fetches the required instruction from the L1 instruction cache 40. The fetched instruction from step 54 or step 56 is then decoded at step 58 to generate the micro-operation identified by the micro program counter of the decode request 24. At this point, the decoder 30 generates only the micro-operation specified by the decode request. Other micro-operations of the same program instruction either will already have been generated, or will be generated later in response to other decode requests. At step 60, the shared instruction decoder 30 determines whether the newly generated micro-operation is the last micro-operation for the decoded program instruction. If the generated micro-operation is the last micro-operation then at step 62 the control flag L is set to 1, while if there is still at least one remaining micro-operation to be generated then the control flag is set to 0 at step 64. At step 66, the micro-operation and the control flag L are output to the L0 instruction cache 20. At step 68, the decoder 30 waits for the next decode request, when the method returns to step 50. While FIG. 7 shows handling of a single decode request, in some embodiments the decoder 30 may be able to service multiple decode requests per processing cycle and in this case then the steps of FIG. 7 would be performed for each received decode request.

Figure 8A:
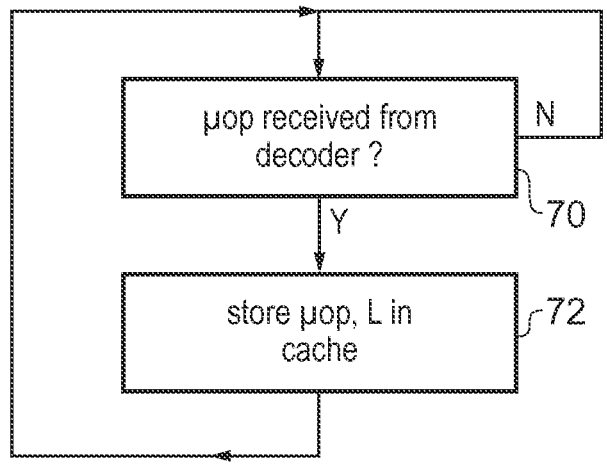
FIGS. 8A and 8B illustrate functions performed by a micro-operation cache for storing decoded micro-operations generated by the decoder.
Figure 8B:
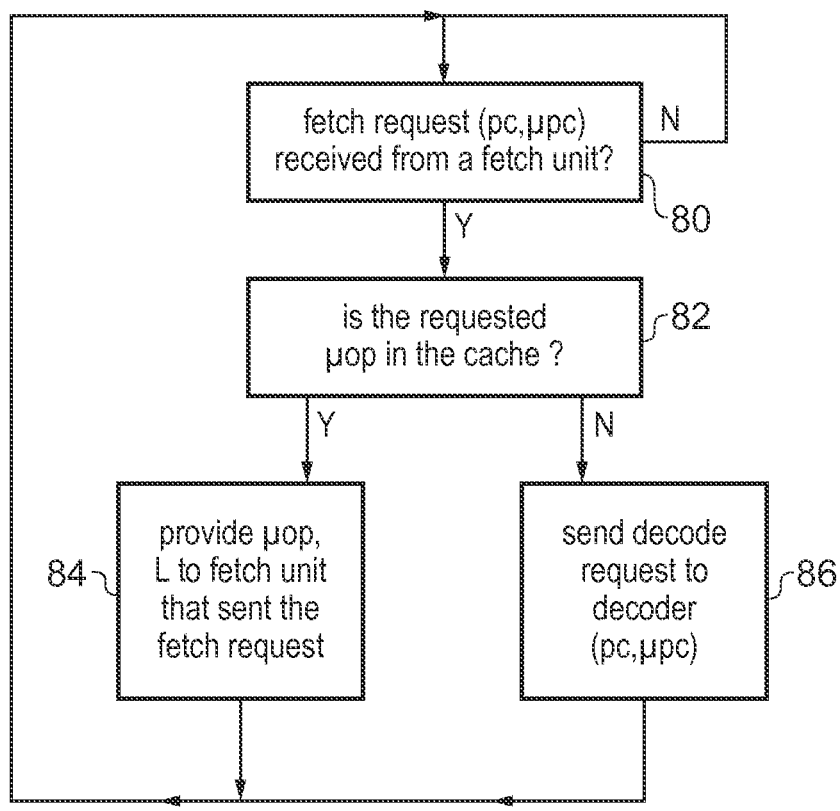

FIGS. 8A and 8B illustrate functions performed by the L0 instruction cache 20. FIG. 8A shows a method of storing micro-operations in the cache 20. At step 70, the L0 instruction cache 20 receives a micro-operation from the shared instruction decoder 30. At step 72, the L0 instruction cache 20 stores the micro-operation and the control flag L in the cache 20. The cache 20 also stores the program counter and the micro program counter corresponding to the corresponding micro-operation so that it can identify which micro-operations are stored in the cache and respond to fetch requests 16 accordingly. For example, the program counter and micro program counter may act as a tag for locating the entry of the L0 instruction cache 20 storing a required micro-operation.

FIG. 8B shows the functions performed by the L0 instruction cache 20 in response to a fetch request 16. At step 80, a fetch request is received from one of the fetch units 8. The fetch request 16 specifies the current values of the program counter 12 and micro program counter 14 for the corresponding fetch unit 8. At step 82, the cache 20 determines whether the requested micro-operation identified by the program counter and micro program counter is stored in the cache 20. If so, then at step 84 the cache 20 provides the requested micro-operation and the corresponding control flag L to the fetch unit 8 that sent the fetch request 16. If the requested micro-operation is not in the cache then at step 86 the cache 20 sends a decode request 24 to the instruction decoder 30. The decode request 24 includes the program counter and micro program counter that were included in the fetch request 16 that triggered the decode request 24. The method then proceeds to step 80 where the cache 20 awaits the next fetch request 16. Again, the L0 instruction cache 20 may handle multiple fetch requests in parallel in the same processing cycle, in which case the steps of FIG. 8B would be performed for each fetch request.

Figure 9:
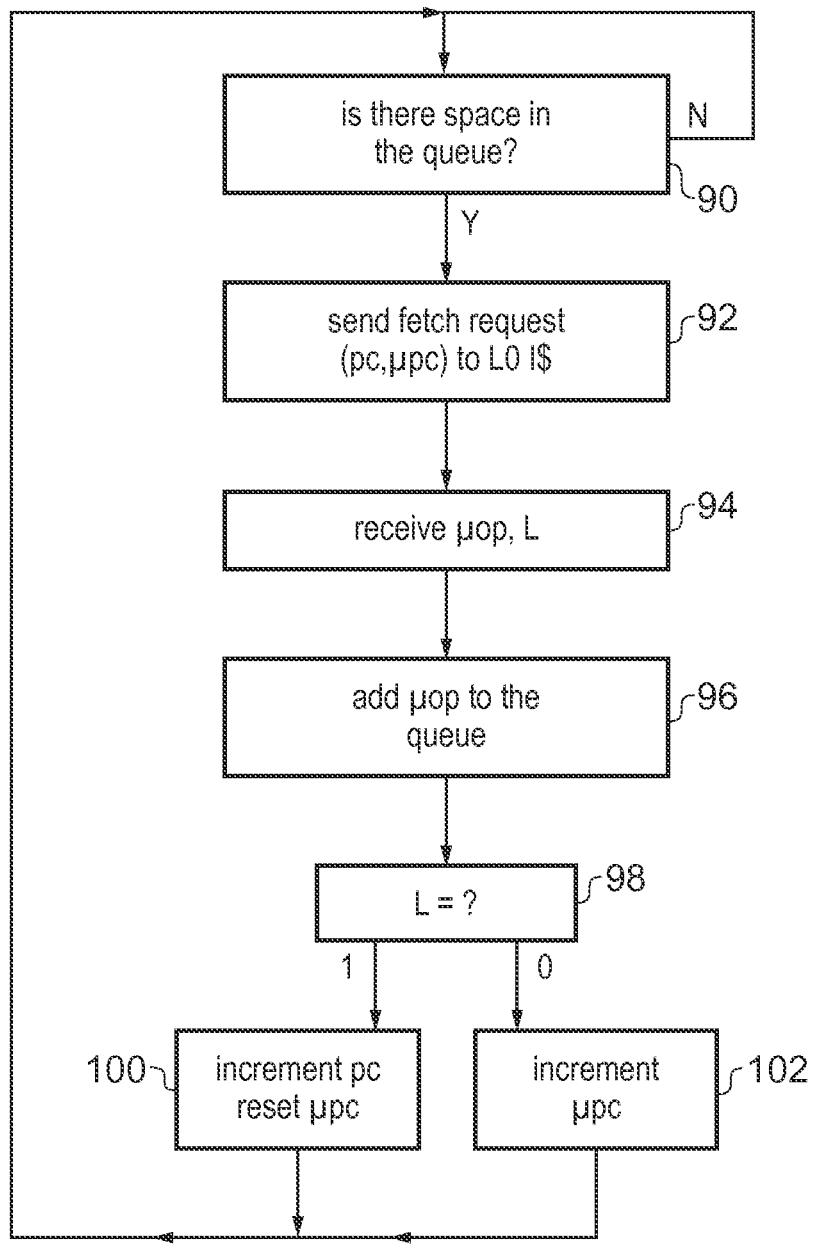
FIG. 9 illustrates a method of fetching micro-operations to be performed by the processing circuitry.

FIG. 9 is a flow diagram illustrating functions performed by the fetch unit 8. At step 90, the fetch unit 8 determines whether there is space in the corresponding micro-operation queue 6 for the next micro-operation to be fetched. If there is space, then at step 92 the fetch unit 8 sends a fetch request 16 to the L0 instruction cache 20, the fetch request 16 indicating the current values of the program counter 12 and micro program counter 14 maintained by that fetch unit 8. At step 94, the fetch unit 8 receives the requested micro-operation as well as the control flag L corresponding to that micro-operation. Step 94 may occur relatively soon after the fetch request was issued at step 92 if the requested micro-operation is stored in the L0 cache 20, or there could be a delay if the L0 cache 20 has to obtain the micro-operation from the decoder 30 first. At step 96, the fetch unit 8 adds the received micro-operation to the queue 6.

At step 98, the fetch unit 8 determines the value of the control flag L, for the fetched micro-operation. If the control flag has a value of 1 then the fetched micro-operation is the last micro-operation for the current program instruction, and so at step 100 the fetch unit 8 increments the program counter 12 to indicate the next program instruction and resets the micro program counter 14 to indicate the first micro-operation to be fetched for the new program instruction. On the other hand, if at step 98 the fetch unit 8 determines that the control flag L has a value of 0 then the micro-operation is not the last micro-operation, and so at step 102 the fetch unit 8 increments the micro program counter to indicate the next micro-operation to be fetched for the same program instruction, and the program counter 12 is not incremented. In this context, the term "increment" means that the program counter or micro program counter is set to the value required for the next micro-operation to be fetched. The incrementing need not be by the same amount each time. For example, the program counter may generally be incremented by a certain amount such as an interval between addresses of adjacent instruction, but sometimes there may need to be a different increment amount. For example, the fetch unit may include a branch predictor and if a branch is predicted taken then a non-sequential instruction fetch may be performed. Also, while FIGS. 7 and 9 show an example where the value of 1 of the control flag L indicates the last micro-operation of a complex instruction and a value of 0 of the control flag L indicates a micro-operation other than the last micro-operation, in other examples these values could be swapped or this information could be represented in a different way.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
    processing circuitry configured to process a plurality of threads of processing in parallel;
    a shared instruction decoder configured to decode program instructions to generate micro-operations to be processed by the processing circuitry, the program instructions comprising at least one complex program instruction corresponding to a plurality of micro-operations;
    a plurality of fetch units configured to fetch, for processing by the processing circuitry, the micro-operations generated by the shared instruction decoder, each fetch unit associated with at least one of the plurality of threads; and
    a micro-operation cache configured to store the micro-operations generated by the shared instruction decoder, wherein:
    the shared instruction decoder is configured to generate each micro-operation in response to a decode request triggered by one of the plurality of fetch units;
    the shared instruction decoder is configured to generate the plurality of micro-operations of a complex program instruction individually in response to separate decode requests each identifying which micro-operation of the complex program instruction is to be generated by the shared instruction decoder in response to the decode request; and
    the micro-operation cache is configured to support a greater number of fetch requests per processing cycle than the number of decode requests per processing cycle supported by the shared instruction decoder.

2. The data processing apparatus according to claim 1, comprising a plurality of micro-operation queues each corresponding to one of the fetch units and configured to queue the micro-operations fetched by the corresponding fetch unit for processing by the processing circuitry.

3. The data processing apparatus according to claim 1, wherein the fetch unit is configured to generate the decode request identifying a selected micro-operation to be generated by the shared instruction decoder and to be fetched for processing by the processing circuitry.

4. The data processing apparatus according to claim 1, wherein the fetch circuitry is configured to provide a fetch request to the micro-operation cache to request fetching of a selected micro-operation from the micro-operation cache; and
the micro-operation cache is configured to trigger a decode request for the selected micro-operation if the selected micro-operation is not stored in the micro-operation cache.

5. The data processing apparatus according to claim 1, wherein for each micro-operation, the shared instruction decoder is configured to generate a corresponding control flag indicating whether the micro-operation is the last micro-operation for the corresponding program instruction.

6. The data processing apparatus according to claim 5, wherein each fetch unit is configured to maintain a program counter and micro program counter for identifying the next micro-operation to be fetched, the program counter indicating a program instruction corresponding to said next micro-operation and the micro program counter indicating which micro-operation of the corresponding program instruction is said next micro-operation; and
each fetch unit is configured to:
(i) increment the micro program counter if the control flag for a fetched micro-operation indicates that the fetched micro-operation is not the last micro-operation for the corresponding program instruction; and
(ii) increment the program counter if the control flag for a fetched micro-operation indicates that the fetched micro-operation is the last micro-operation for the corresponding program instruction.

7. The data processing apparatus according to claim 1, comprising an instruction buffer configured to store one or more program instructions previously decoded by the shared instruction decoder.

8. The data processing apparatus according to claim 7, wherein the instruction buffer is configured to store the one or more program instructions that were most recently decoded by the shared instruction decoder.

9. The data processing apparatus according to claim 7, wherein the instruction buffer is configured to store a single program instruction.

10. The data processing apparatus according to claim 1, wherein each fetch unit is configured to maintain a program counter and micro program counter for identifying the next micro-operation to be fetched, the program counter indicating a program instruction corresponding to said next micro-operation and the micro program counter indicating which micro-operation of the corresponding program instruction is said next micro-operation.

11. The data processing apparatus according to claim 7, wherein in response to the decode request for a specified program instruction:
(a) if the specified program instruction is stored in the instruction buffer, then the shared instruction decoder is configured to obtain the specified program instruction from the instruction buffer; and (b) if the specified program instruction is not stored in the instruction buffer, then the shared instruction decoder is configured to obtain the specified program instruction from an instruction cache or memory.

12. The data processing apparatus according to claim 1, wherein the processing circuitry comprises a plurality of processing units each configured to process at least one of the plurality of threads.

13. The data processing apparatus according to claim 1, wherein the processing circuitry is configured to execute in parallel, for at least one of the plurality of threads, a plurality of instances of the same one or more micro-operations in lockstep with different operands for each instance.

14. The data processing apparatus according to claim 1, wherein the processing circuitry is configured to perform time division multiplexing of at least some of the plurality of threads.

15. The data processing apparatus according to claim 1, wherein the processing circuitry comprises a graphics processing unit (GPU).

16. A data processing apparatus comprising:
processing means for processing a plurality of threads of processing in parallel;
shared instruction decoding means for decoding program instructions to generate micro-operations to be processed by the processing means, the program instructions comprising at least one complex program instruction corresponding to a plurality of micro-operations; and
a plurality of fetch means for fetching, for processing by the processing means, the micro-operations generated by the shared instruction decoding means, each fetch means associated with at least one of the plurality of threads; and
a means for storing the micro-operations generated by the shared instruction decoding means, wherein:
the shared instruction decoding means is configured to generate each micro-operation in response to a decode request triggered by one of the plurality of fetch means; and
the shared instruction decoding means is configured to generate the plurality of micro-operations of a complex program instruction individually in response to separate decode requests each identifying which micro-operation of the complex program instruction is to be generated by the shared instruction decoding means in response to the decode request; and
the means for storing the micro-operations is configured to support a greater number of fetch requests per processing cycle than the number of decode requests per processing cycle supported by the shared instruction decoding means.

17. A data processing method, comprising:
decoding program instructions with a shared instruction decoder to generate micro-operations to be processed, the program instructions comprising at least one program instruction corresponding to a plurality of micro-operations;
fetching for processing the micro-operations generated by the shared instruction decoder, wherein the fetching is performed with a plurality of fetch units, each fetch unit associated with at least one of a plurality of threads processed in parallel; and
storing the micro-operations generated by the shared instruction decoder on a micro-operation cache, wherein:

each micro-operation is generated by the shared instruction decoder in response to a decode request triggered by one of the plurality of fetch units; and the shared instruction decoder generates the plurality of micro-operations of a complex program instruction individually in response to separate decode requests each identifying which micro-operation of the complex program instruction is to be generated in response to the decode request; and the micro-operation cache supports a greater number of fetch requests per processing cycle than the number of decode requests per processing cycle supported by the shared instruction decoder.

18. The method of claim 17, comprising steps of:

in response to a first decode request identifying a first micro-operation of a first complex program instruction, decoding the first complex program instruction to generate the first micro-operation;

in response to a second decode request identifying a selected micro-operation of a second complex program instruction, decoding the second complex program instruction to generate the selected micro-operation; and in response to a third decode request identifying a second micro-operation of the first complex program instruction, decoding the first complex program instruction to generate the second micro-operation.

* * * * *